(12) United States Patent
Sueck et al.

(10) Patent No.: US 8,113,325 B2
(45) Date of Patent: Feb. 14, 2012

(54) HYDRODYNAMIC CLUTCH ARRANGEMENT

(75) Inventors: Gregor Sueck, Sennfeld (DE); Oliver So, Schweinfurt (DE); Thomas Krüger, Berlin (DE); Monika Rössner, Donnersdorf (DE); Thomas Walter, Kolitzheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1138 days.

(21) Appl. No.: 11/897,140

(22) Filed: Aug. 29, 2007

(65) Prior Publication Data

US 2008/0053774 A1    Mar. 6, 2008

(30) Foreign Application Priority Data

Sep. 1, 2006    (DE) .......................... 10 2006 041 158

(51) Int. Cl.
*F16H 45/02* (2006.01)
*F16H 41/24* (2006.01)
*F16D 33/20* (2006.01)

(52) U.S. Cl. ............................. 192/3.29; 60/338; 60/357
(58) Field of Classification Search ...................... 60/338
See application file for complete search history.

(56) References Cited

U.S. PATENT DOCUMENTS

| | | |
|---|---|---|
| 5,086,892 A | 2/1992 | Schierling |
| 5,388,678 A * | 2/1995 | Murata ........................ 192/3.29 |
| 5,992,589 A * | 11/1999 | Fukushima .................. 192/3.29 |
| 6,435,998 B1 * | 8/2002 | Sudau et al. ................. 192/3.28 |
| 7,143,879 B2 | 12/2006 | Ackermann et al. |

FOREIGN PATENT DOCUMENTS

| | | |
|---|---|---|
| DE | 25 53 884 | 6/1977 |
| DE | 103 58 902 | 6/2005 |
| WO | WO 2007/005447 | 5/2007 |

OTHER PUBLICATIONS

Search Report dated Jan. 24, 2008 issued for the corresponding European Patent Application No. EP 07 01 5851.

* cited by examiner

*Primary Examiner* — Rodney Bonck
(74) *Attorney, Agent, or Firm* — Cozen O'Connor

(57) ABSTRACT

A hydrodynamic clutch device used to establish and to release a working connection between a drive and a takeoff is disclosed. The device includes a housing capable of rotating around an axis of rotation, the housing containing a torus space, which forms a torus volume (TV) with a pump wheel and a turbine wheel, and a clutch space, which forms the boundaries of the clutch volume (CV) and which encloses a mechanical transmission circuit including a bridging clutch designed with a torsional vibration clamper. During the course of the minimum resting phase of the housing, the fluid which is distributed throughout the housing during the operating state decreases from a total volume comprising at least the torus volume (TV) and the clutch volume (CV) to a resting volume (RV), which is located at least essentially underneath the axis of rotation as a result of the force of gravity. A volume reduction arrangement is provided to the housing to reduce the clutch volume (CV) versus the resting volume (RV).

12 Claims, 6 Drawing Sheets

_HYDRODYNAMIC CLUTCH ARRANGEMENT_

BACKGROUND OF THE INVENTION

1. Field of the Invention

The invention relates to a hydrodynamic clutch arrangement which is used to establish and to release a working connection between a drive and a takeoff.

2. Description of the Related Art

A hydrodynamic clutch arrangement of this type, which is known from FIG. 5 of DE 103 58 902 A1, is used to establish and to release a working connection between a drive, such as the crankshaft of an internal combustion engine, and a takeoff, such as a gearbox input shaft, and is designed with a housing, which is free to rotate around an axis of rotation. In DE 103 58 902 A1, the clutch arrangement is designed as a hydrodynamic torque converter, in which a hydrodynamic circuit is provided with a pump wheel, a turbine wheel, and a stator, which together form a torus volume (TV) enclosed by a torus space. In addition, the hydrodynamic clutch arrangement is provided with a bridging clutch, by means of which the hydrodynamic circuit can be bypassed with respect to the transfer of torque from the drive to the takeoff, where a torsional vibration damper with two sets of circumferential springs is assigned to the bridging clutch to damp torsional vibrations. The bridging clutch and the torsional vibration damper together form a mechanical transmission circuit, which is located inside a clutch space of the housing, where a clutch volume (CV) is determined by this clutch space.

The hydrodynamic torque converter shown in FIG. 5 of DE 103 58 902 A1 is evidence of a development trend, frequently observed in recent years in hydrodynamic clutch arrangements, according to which the size of the torus space is limited so that the clutch arrangement will fit in a more compact space. There are also trends toward increasing the number of plates in the bridging clutch so that higher torques can be transmitted and toward installing more powerful and therefore more complicated torsional vibration dampers. Because these larger components occupy a considerable amount of room in the clutch arrangement, a larger clutch space is required. FIGS. 1-3 are attached to the present specification to make it easier to understand the explanation of the relevant spaces present in a hydrodynamic clutch arrangement, i.e., the spaces which define the corresponding volumes. FIG. 1 shows the torus volume (TV); FIG. 2 shows the clutch volume (CV); and FIG. 3 shows the resting volume (RV). The resting volume (RV) is present after a minimum resting phase, during which some of the fluid in the hydrodynamic clutch arrangement sinks under the force of gravity into the part of the housing located underneath the axis of rotation, and the rest of the fluid leaves the housing through the flow routes provided.

When the motor vehicle containing the hydrodynamic clutch arrangement is restarted, centrifugal force begins to distribute the fluid present in the resting volume (RV) throughout the torus volume (TV) and the clutch volume (CV), but at the same time, because the pressure in the torus volume (TV) is positive with respect to that in the clutch volume (CV), at least some of the fluid remaining in the torus volume (TV) is drawn into the clutch volume (CV). This problem is made even worse when the driver shifts the transmission into "Drive" (D), because, as a result, the drive starts to run at a predetermined speed, whereas the takeoff and thus the torsional vibration damper remain essentially at rest. In spite of the applied centrifugal force, this causes fluid to be drawn in the radially inward direction through the torsional vibration damper. If the hydrodynamic clutch arrangement is designed as a two-line system, it is true that, in this operating state, fresh fluid is introduced from a fluid reservoir into the clutch volume (CV) via the opened bridging clutch, but, instead of proceeding initially into the torus volume (TV), this fluid is also drawn radially inward and thus remains in the clutch space. When the vehicle is being started up, these conditions are expressed by the inability of the torus volume (TV), which at this point is still almost completely empty, and of the opened bridging clutch to transmit any significant amount of the torque being introduced by the drive to the takeoff. Only the slip torque of the bridging clutch is able to provide for the transmission of a certain residual torque. It is only as the clutch volume (CV) gradually begins to fill up that fresh fluid begins to be transferred to the torus circuit, and only then does that circuit become filled. A performance characteristic of this type, however, cannot be tolerated in a modern motor vehicle.

SUMMARY OF THE INVENTION

The invention is based on a task of designing a hydrodynamic clutch arrangement in such a way that, even though the clutch space is larger than the torus space, the torus space can still be filled with fluid at a satisfactory rate, so that, even after the expiration of the minimum resting time, the ability to transmit a sufficient amount of torque is guaranteed when the engine is restarted.

This task is accomplished by an embodiment of the present invention in which a volume reduction arrangement is introduced into the clutch space of the housing of the hydrodynamic clutch arrangement to reduce the clutch volume (CV). In this way, it is ensured that, after the minimum resting phase subsequent to the operating state, the fluid which has settled under the force of gravity to form a resting volume (RV) underneath the axis of rotation of the housing after the end of the operating state of the drive of a motor vehicle containing the hydrodynamic clutch arrangement, i.e., the fluid which is available for distribution inside the housing by centrifugal force when the drive is restarted, is able not only to fill up the reduced clutch volume (CV) at an accelerated rate but also to fill, at least partially, the torus space as well, thus providing the torus volume (TV) required for the transmission of torque. Thus, when the engine is restarted, sufficient fluid is available promptly in the torus space to ensure a satisfactory transmission of torque from the drive, such as the crankshaft of an internal combustion engine, to a takeoff, such as a gearbox input shaft. This is true even if, as the vehicle is being started up, the driver immediately shifts the transmission into "Drive" (D), which leads to the situation that the pump wheel of the hydrodynamic clutch device starts to turn at the same speed as the drive, whereas the takeoff and thus the torsional vibration damper present in the clutch space are still at rest. In this situation, the volume reduction arrangement will not be able to prevent some fluid from being drawn radially inward inside the clutch space, but because of the significant extent to which the clutch space and possibly the torus space are already filled with fluid, there is no risk that the torus space could be emptied completely.

As the discussion above has made clear, the torque-transmitting capacity of a hydrodynamic clutch arrangement, such as that of a hydrodynamic torque converter or a hydroclutch at the time of a restart after a certain minimum resting phase, depends on the difference between the resting volume (RV) and the clutch volume (CV). This difference can be described by an evaluation factor (K) which is the ratio RV/CV. As long as this evaluation factor (K), according to the relevant claim, assumes a value of 0.9 or more, preferably a value within a range of 1.0-1.2, an advantageous torque-transmitting ability is obtained even after a restart, because, when the clutch volume (CV) and the resting volume (RV) are related to each other in this way, the latter will always be sufficiently large in comparison to the clutch volume (CV) and as a result will be able to provide at least as much fluid as the clutch space can at least essentially hold, inasmuch as its volume has been decreased by the volume reduction arrangement. Thus, even when the vehicle is being started up and the transmission is shifted into Drive (D), a sufficient amount of fluid will always arrive at the torus space to fill it.

The volume reduction arrangement can have a single volume reducing element, but it can also have a plurality of these reducing elements. It is especially advantageous for at least some of these reducing elements to be located in the radially outer area of the clutch space, that is, on the radially outer wall of the housing of the hydrodynamic clutch arrangement, so that they can project from there into the clutch space and reduce its volume; that is, they will project into the areas of the clutch space which are not occupied by components of the mechanical transmission circuit such as the bridging clutch and the torsional vibration damper. In this way it is possible, with modest technical effort, to achieve a considerable reduction in the volume of the space. It can be especially preferable for the individual volume reducing element to be designed essentially in the form of a ring. Through appropriate selection of the material for these volume reducing elements, it is also possible to exert an advantageous influence on the inertial behavior of the hydrodynamic clutch device, in the sense that volume reducing elements of heavy material such as metal significantly increase the moment of inertia, whereas volume reducing elements of lighter material such as plastic have only a minor effect. It is also possible simply to lay a volume reducing element in the clutch space, but the element can also be connected to the housing of the clutch arrangement in such a way that it cannot move axially or rotationally.

Alternatively or in addition, it is also possible to provide at least one volume reducing element of the volume reduction arrangement in a different area of the clutch space; for example, it can be attached to a component assigned to the torus space such as the turbine wheel or the stator. It is also conceivable that a torsional vibration damper installed in the clutch space could be provided with an encapsulation, which would at least essentially prevent fluid from entering the torsional vibration damper. It is also possible to make the capsule space enclosed by the encapsulation considerably larger than the torsional vibration damper. The goal of this measure is to reduce the clutch volume (CV) by an amount equal to the volume of the torsional vibration damper present inside the encapsulation. In this embodiment, the torsional vibration damper would also act as a volume reducing element of the volume reduction arrangement. This is also true even if the encapsulation of the torsional vibration damper is provided with lubrication channels for fluid contained in the clutch space, because the rate at which fluid can enter the capsule space through these lubrication channels is very slow after a restart.

Although the torus space serves the function of hydrodynamically transmitting torque, an area which is at least essentially unusable in this respect, namely, the internal torus space enclosed by the pump wheel, the turbine wheel, and the stator, is still present inside the torus space. If the clutch space has already been reduced by volume reducing elements of a volume reduction arrangement, it is nevertheless possible, through the use of a volume reducing element in the internal torus space, to achieve an additional reduction of the fluid-holding space inside the housing of the hydrodynamic clutch device. As a result, even if the clutch space cannot hold any volume reducing elements because of the way in which it is designed, it is still possible to improve the torque-transmitting capacity after a restart.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, an exemplary embodiment of the invention is presented, where FIGS. 1-3 of the drawing show merely a diagram of the relevant volumes. The inventive volume reduction arrangement is not shown until FIG. 5.

DETAILED DESCRIPTION OF THE PREFERRED EMBODIMENTS

Figure 4:
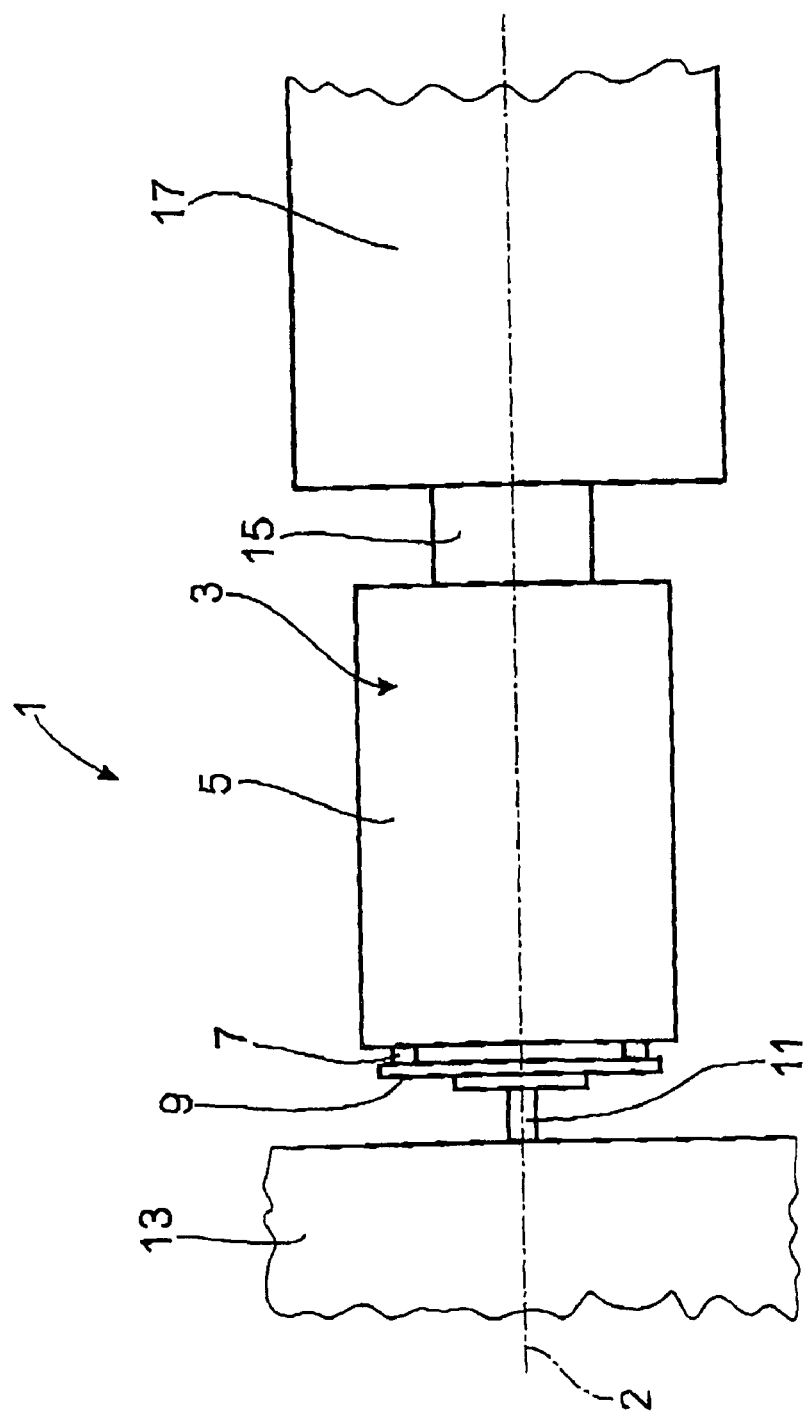
FIG. 4 shows a schematic diagram of a drive train with the hydrodynamic clutch arrangement.

FIG. 4 shows a schematic diagram of a drive train 1 with a hydrodynamic clutch arrangement 3 rotating around an axis 2. The clutch arrangement 3 comprises a housing 5, which can be connected for rotation in common to a drive 11, such as the crankshaft of an internal combustion engine 13, by means of a plurality of fastening elements 7 and a connecting element 9 such as a flexplate. On the axial side facing away from the drive 11, the housing 5 has a housing hub 15, which engages, for example, in a gearbox arrangement 17 and causes a fluid delivery pump there (not shown) to rotate, this pump serving to supply the housing 5 with fluid. A takeoff (not shown) in the form of a gearbox input shaft, the free end of which projects into the housing 5, is arranged concentrically with respect to the housing hub 15.

Figure 5:
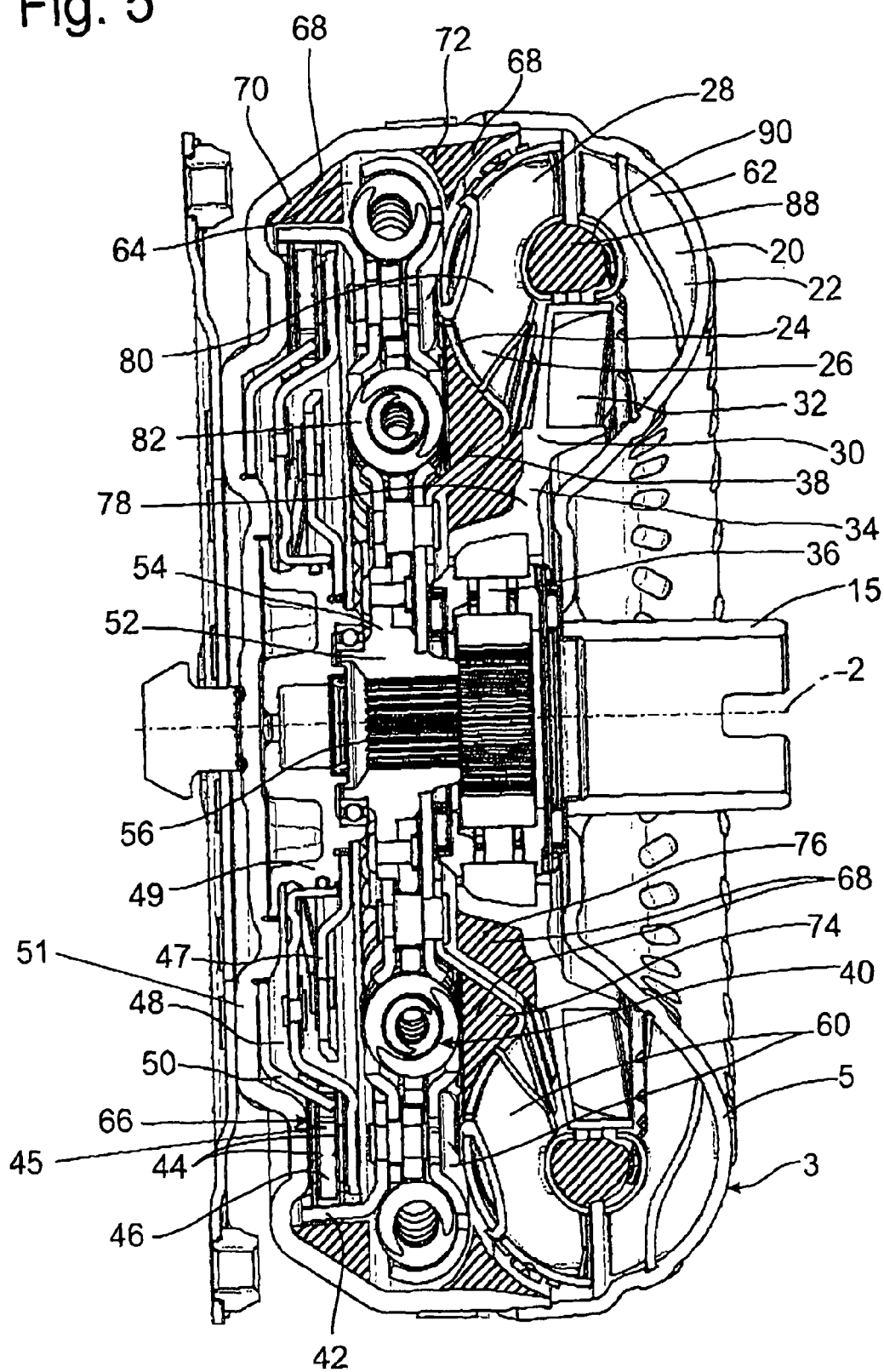
FIG. 5 shows a diagram similar to FIG. 1, except that volume reducing elements of a volume reduction arrangement have been installed in the clutch space and in the torus space.

As FIG. 5 shows in detail, the side of the housing 5 facing away from the drive 11 holds a set of pump vanes 20 and thus forms a pump wheel 22, whereas a turbine shell 24 holds a set of turbine vanes 26 and thus forms a turbine wheel 28. A set of stator vanes 32 of a stator 30 is held between the turbine wheel 28 and the pump wheel 22. The hub 34 of the stator is positioned on a freewheel 36. This is seated for its own part on the gearbox input shaft serving as the takeoff in the manner known from the previously cited DE 103 58 902 A1.

Figure 1:
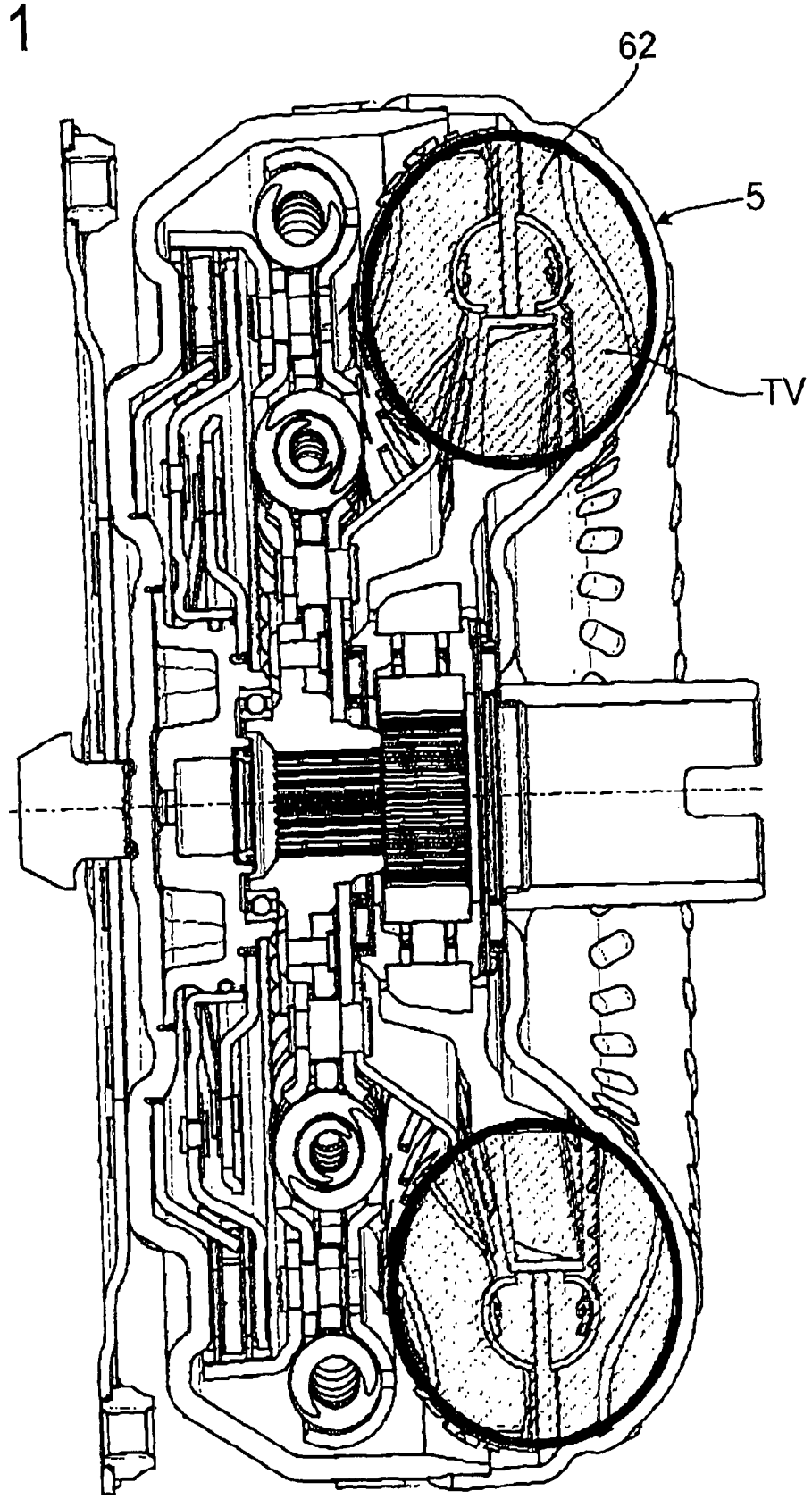
FIG. 1 shows a cross section of a hydrodynamic clutch arrangement with a torus space and a clutch space, where the torus volume (TV) determined by the torus space is shaded for emphasis.

In the area over which their vane blading 20, 26, 32 extends, the pump wheel 22, the turbine wheel 28, and the stator 30 together form a torus space 62, which at least essentially encloses a torus volume (TV), as emphasized by the shading in FIG. 1.

The turbine wheel 28 engages by way of its turbine hub 38 with a torsional vibration damper 40, which is connected nonrotatably to the radially outer plates 44 of a bridging clutch 45. Axially between these plates 44 is a radially inner plate 46, which is connected nonrotatably to a drive-side housing cover 51 of the housing 5 by way of an anti-twist device 50. A working connection can be established between the plates 44 and 46 for the transmission of a torque from the housing 5 to the takeoff, in that a piston 47, which is able to shift position axially on a cover hub 49 of the cover 51, is shifted toward the housing cover 51, which occurs when the pressure in a hydrodynamic circuit 60 on the side of the piston 47 facing away from the housing cover 51 is greater than that in a pressure chamber 48, which is located axially between the housing cover 51 and the piston 47. As soon as the working connection between the plates 44 and 46 and thus also the housing cover 51 has been established by the piston 47, the bridging clutch 45 is in its engaged position. Conversely, the bridging clutch 45 is moved into its released position when the pressure in the pressure chamber 48 is positive with respect to that in the hydrodynamic circuit 60.

The bridging clutch 45, which forms a mechanical transmission circuit 66 together with the torsional vibration damper 40, is accommodated together with the torsional vibration damper 40 in a clutch space 64. This, as can be seen in FIG. 2 on the basis of the shading, encloses a clutch volume (CV).

It remains to be said about the torsional vibration damper 40 only that it has a torsion damper hub 54, which serves as a takeoff part 52 and by means of which it is connected nonrotatably by a set of teeth 56 to the takeoff.

Figure 2:
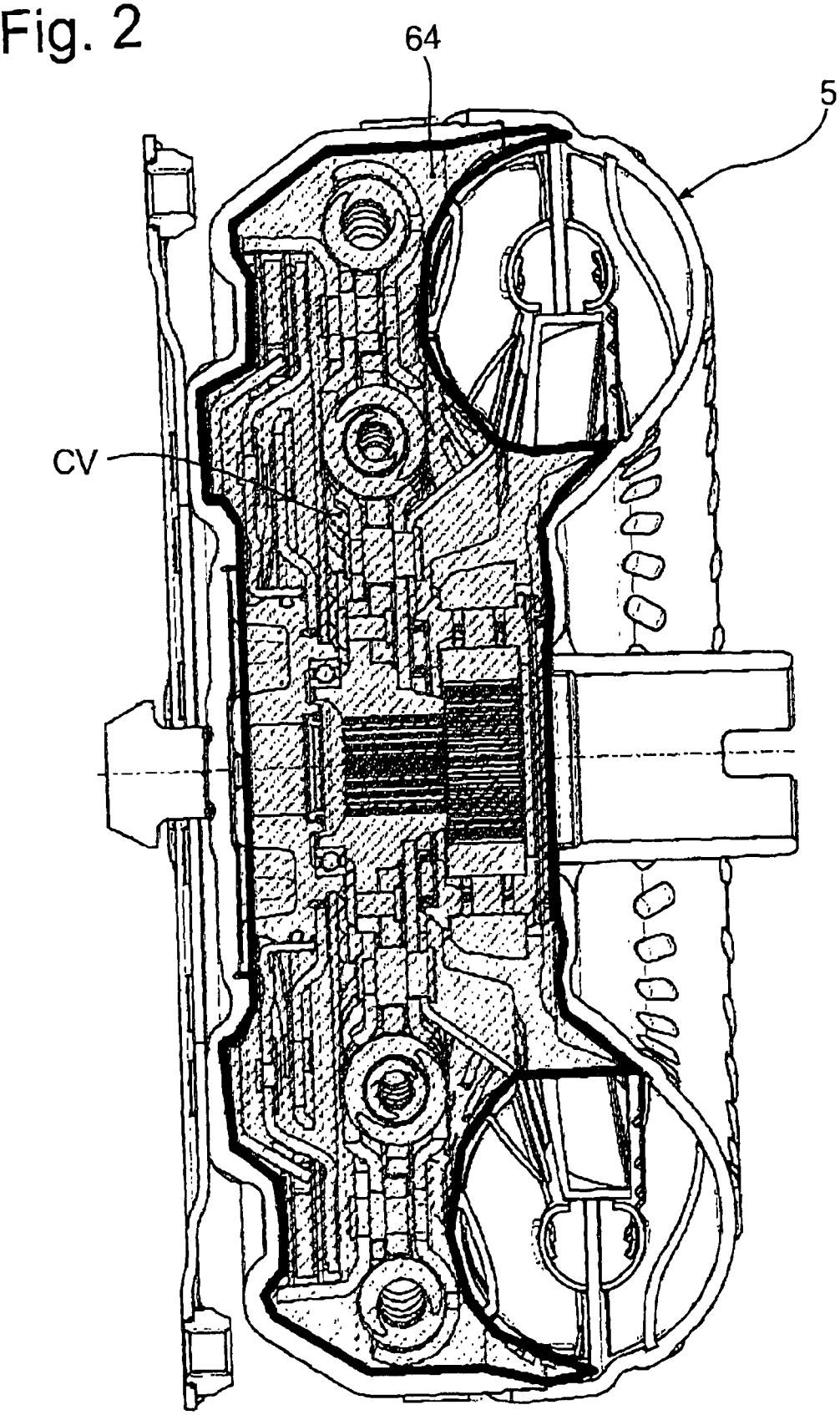
FIG. 2 is similar to FIG. 1 but shows the clutch volume (CV), emphasized by shading, inside the clutch space.
Figure 3:
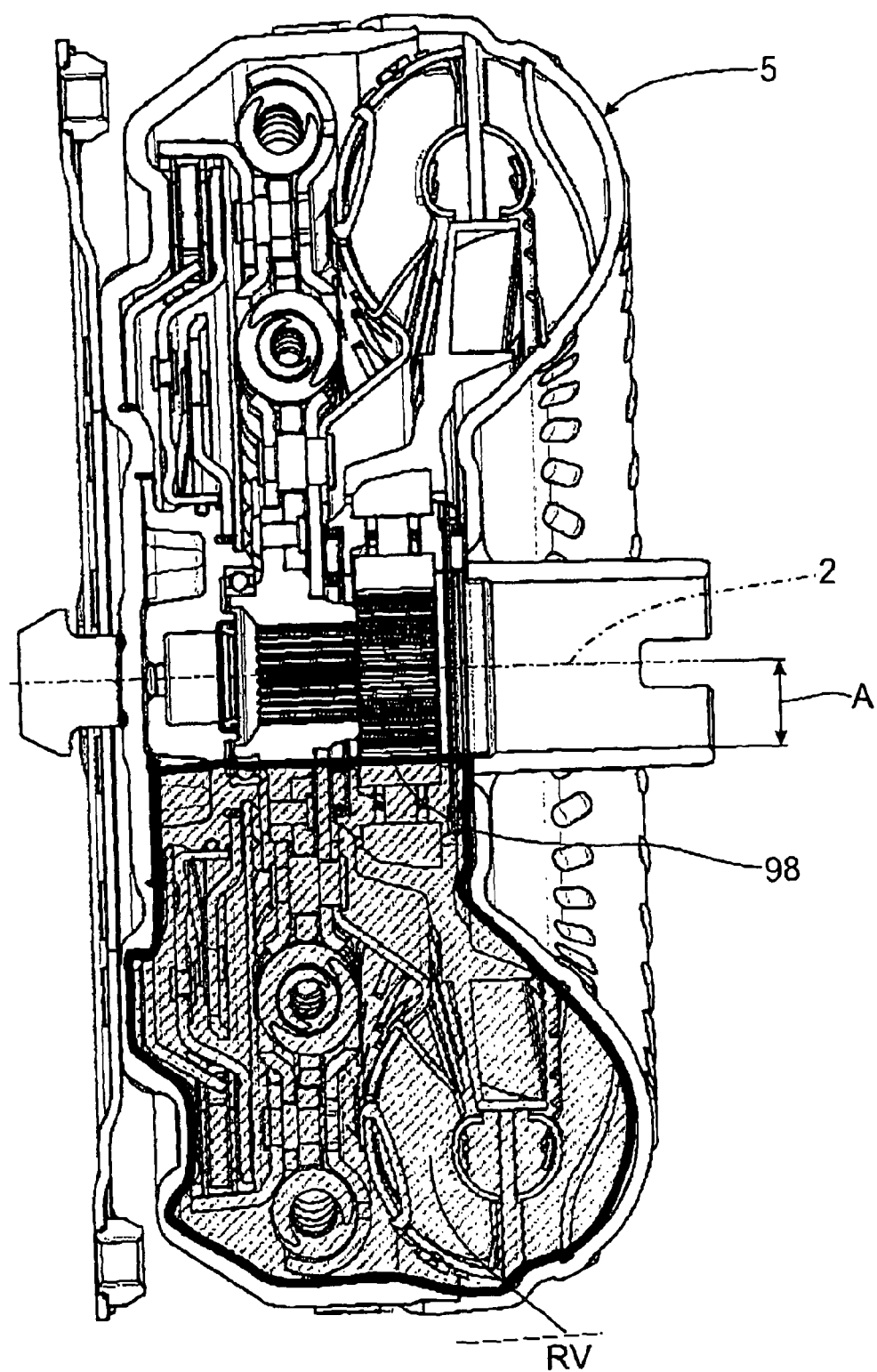
FIG. 3 is similar to FIG. 1 but shows the resting volume (RV), emphasized by shading.

The torus volume (TV) shown in FIG. 1 and the clutch volume (CV) shown in FIG. 2 together form a total volume, through which fluid circulates during the operating state of the clutch arrangement 3, that is, while the housing 5 is turning around the axis of rotation 2 and the fluid is thus being subjected to centrifugal force. Sufficient fluid is present in the torus space 62 to allow the transmission of even relatively high torques. After the end of this operating state, the housing 5 is no longer rotating, and this allows some of the fluid constituting the total volume to leave the housing 5 through supply channels (not shown) of the clutch arrangement 3. The rest of the fluid collects in the housing 5 underneath the axis of rotation 2 by the force of gravity. After a certain time at rest, which is referred to below as the "minimum resting phase" and which can easily be in the range of 30-60 hours, the state shown in FIG. 3 is reached, in which all of the fluid still present in the housing 5 has collected underneath the axis of rotation 2. This fluid-occupied volume is referred to in the following as the "resting volume" (RV).

As shown in FIG. 5, two essentially ring-shaped volume reducing elements 70, 72 of a volume reduction arrangement 68 are supported on the radially outer wall or area of the housing 5 a certain axial distance apart. The drive-side volume reducing element 70 is located essentially axially between the housing cover 51 and the torsional vibration damper 40, whereas the takeoff-side volume reducing element 72 is located axially between the torsional vibration damper 40 and the turbine wheel 28 and thus the torus space 62. These volume reducing elements 70, 72 can be made of metal or of plastic, and they can be merely placed in the clutch space 64, or they can be permanently connected to the housing 5 by the use of an adhesive, for example, or by riveting or welding.

Another volume reducing element 74 of the volume reduction arrangement 68 is formed on or attached to the turbine hub 38 of the turbine wheel 28, whereas another volume reducing element 76 is formed on or attached to the stator hub 34 of the stator 30. The two last-mentioned volume reducing elements 74, 76 are thus attached to components 78 and 80 which belong to the torus space 62 and which are able to rotate relative to the housing 5, the component 78 being formed by the stator 30, the component 80 by the turbine wheel 28.

Figure 6:
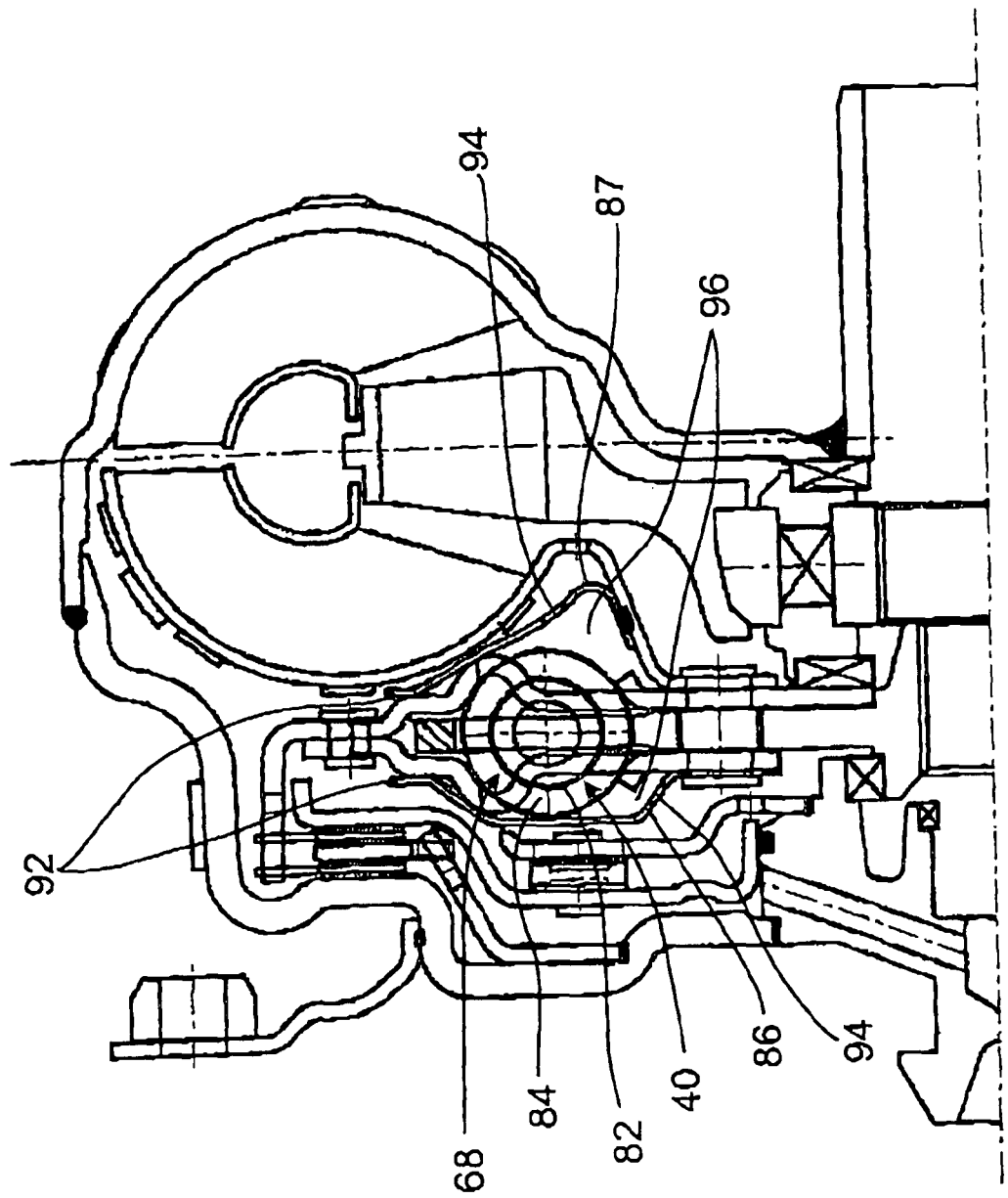
FIG. 6 shows a diagram of an encapsulation for a torsional vibration damper serving as a volume reducing element of a volume reduction arrangement.

Another possibility of forming a volume reducing element 84 in the clutch space is shown in FIG. 6. The torsional vibration damper 40 shown here, which serves as an additional component 82 for accepting a volume reducing element 84, has seals 86, 87 in the form of diaphragm-like cover plates on both axial sides. The seal 86 is attached directly to the torsional vibration damper 40, whereas the seal 87 is attached to the turbine hub 38 of the turbine wheel 28. The two seals 86 and 87 together form an encapsulation 92 for the torsional vibration damper 40, where a capsule space 96 enclosed by the encapsulation 92 forms a capsule space volume, by which the clutch volume (CV) of the clutch space 64 is reduced. This capsule space volume can be considerably larger than the minimum volume required to hold the torsional vibration damper 40, in that, as can be seen in FIG. 6, the seal 87 is located a certain distance away from the torsional vibration damper 40. This makes it easy to influence the size of the capsule space volume.

So that the torsional vibration damper 40 can be operated advantageously, a lubricant supply can be advisable. For this purpose, at least one of the seals 86, 87 can be provided with lubricant channels 94; these channels, however, are dimensioned in such a way that they allow only a small amount of fluid to leak through.

Another, at least essentially ring-shaped, volume reducing element 88 can be seen in FIG. 5, but it is not in the clutch space 64 but rather in the torus space 62. This volume reducing element 88 is located in an internal torus space 90 and thus in an area of the torus space 62 which is not essential to the ability of the clutch arrangement 3 to transmit torque hydrodynamically.

Regardless of their positioning inside the clutch space 64, the purpose of the volume reducing elements 70, 72, 74, 76, and 84 is to bring about a decrease in the clutch volume (CV) in the clutch space 64 and thus to bring the size of the clutch volume (CV) closer to that of the resting volume (RV) reached after the minimum resting phase. This effect, achievable by means of the volume reducing elements 70, 72, 74, 76, and 84 of the volume reduction arrangement 68, can be determined or defined by means of an evaluation factor K, which is calculated by means of the following formula:

$$K = \text{resting volume } (RV)/\text{clutch volume } (CV)$$

When the clutch volume (CV) is reduced, the resting volume (RV) is also reduced, but not to the same degree as the clutch volume (CV). The reason for this is that the surface level 98 of the resting volume (RV) (see FIG. 3) settles at a value A below the axis of rotation 2, so that, during this operating state, the fluid-free part of the clutch volume (CV) projects beyond the axis of rotation 2 by the value A. The fluid-free clutch volume (CV) is accordingly larger than the resting volume (RV). As a result of the volume reduction arrangement 68, therefore, the fluid-free part of the clutch volume (CV) is decreased to a greater extent than the resting volume (RV), and thus the evaluation factor K is increased.

To ensure that the housing 5 can be filled effectively when the drive 1 and thus the hydrodynamic clutch arrangement 3 are restarted after the minimum resting phase, the evaluation factor K should be above a value of 0.9 and preferably should be within the range of 0.9-1.2. With respect to the number and the dimensions of the individual volume reducing elements 70, 72, 74, 76, and 84 of the volume reduction arrangement 68, this means that the clutch volume (CV) inside the clutch space 64 which can be filled with fluid, should be reduced by the volume reduction arrangement 68 in such a way that the resting volume (RV) is only insignificantly smaller than the clutch volume (CV). For example, it can be 0.9 times as large as the clutch volume, but it could also be larger than the clutch volume, such as larger by a factor of 1.2. Between these two extremes is an advantageous design range, according to which the resting volume (RV) will be at least essentially equal to the clutch volume (CV), although it can also be up to 1.2 times larger than the clutch volume (CV).

The following applies here: If the desired filling behavior of the housing 5 after the minimum resting phase is already achieved with only one volume reducing element 70, 72, 74, 76 or 84, the volume reduction arrangement 68 needs only this one volume reducing element. If, however, the filling behavior of the housing 5 after the minimum resting phase is still not sufficient with only one volume reducing element 70, 72, 74, 76, or 84, the volume reduction arrangement 68 will be designed with at least one additional volume reducing element 70, 72, 74, 76, or 84. The effect of the reduction of the clutch volume (CV) of the clutch space 64 brought about by the volume reduction arrangement 68 is as follows:

If the clutch volume (CV) has been brought to a value at least approximately equal to the resting volume (RV), then, after the minimum rest phase and a restart, it is ensured right from the beginning that the clutch space 64 can be supplied with at least a sufficient amount of fluid. It is also ensured that fluid is also available for the torus space 62, fluid which can be used for the transmission of torque between the housing 5 and the takeoff. Proceeding from this starting situation in a hydrodynamic clutch arrangement 3, which is assumed to be designed as a two-line system, additional fluid can be supplied very quickly via the pressure chamber 48 to the hydrodynamic circuit 60 during the further course of operation while the bridging clutch 45 is still open. Because the clutch space 64 is already filled, this additional fluid reaches the torus space 62 very quickly, where it completes the refilling of the torus volume (TV). Thanks to the volume reduction arrangement 68 in the clutch space 64, a motor vehicle equipped with the inventive hydrodynamic clutch arrangement 3 can be accelerated quickly even when being restarted after the minimum resting phase.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device for establishing and releasing a working connection between a drive and a takeoff, comprising:
   a housing rotatable around an axis of rotation, the housing defining a clutch space having a clutch volume CV;
   a pump wheel and a turbine wheel which are disposed in the housing and define a torus space having a torus volume TV;
   a mechanical transmission circuit disposed in the clutch space and comprising a bridging clutch and a torsional vibration damper; and
   a volume reduction arrangement in the housing,
   wherein a fluid is distributed throughout the housing and has a total volume comprising at least the torus volume TV and the clutch volume CV during an operating phase of the hydrodynamic clutch device,
   wherein the fluid in the housing decreases from the total volume to a resting volume RV by the force of gravity after a predetermined minimum resting phase of the hydrodynamic clutch device, a top of the resting volume RV being at least essentially below the axis of rotation,
   wherein the volume reduction arrangement is configured to reduce the clutch volume CV relative to the resting volume RV, and
   wherein the volume reduction arrangement is configured so that a ratio of RV/CV is in a range of 0.9 to 1.2.

2. The hydrodynamic clutch arrangement of claim 1, wherein the ratio of RV/CV is in a range of 1.0 to 1.2.

3. The hydrodynamic clutch device of claim 1, wherein the volume reduction arrangement comprises at least one volume reducing element which projects into the clutch space thereby reducing the clutch volume.

4. The hydrodynamic clutch device of claim 3, wherein the at least one volume reducing element is supported on a radially outer wall of the housing.

5. The hydrodynamic clutch device of claim 3, wherein the volume reduction arrangement further comprises another volume reducing element, the another volume reducing element occupying part of the torus space which is not used for hydrodynamic transmission of torque.

6. The hydrodynamic clutch device of claim 1, wherein the volume reduction arrangement comprises a volume reducing element, the volume reducing element occupying part of the torus space which is not used for hydrodynamic transmission of torque.

7. A hydrodynamic clutch device for establishing and releasing a working connection between a drive and a takeoff, comprising:
   a housing rotatable around an axis of rotation, the housing defining a clutch space having a clutch volume CV;
   a pump wheel and a turbine wheel which are disposed in the housing and define a torus space having a torus volume TV;
   a mechanical transmission circuit disposed in the clutch space and comprising a bridging clutch and a torsional vibration damper; and
   a volume reduction arrangement in the housing,
   wherein a fluid is distributed throughout the housing and has a total volume comprising at least the torus volume TV and the clutch volume CV during an operating phase of the hydrodynamic clutch device,
   wherein the fluid in the housing decreases from the total volume to a resting volume RV by the force of gravity after a predetermined minimum resting phase of the hydrodynamic clutch device, a top of the resting volume RV being at least essentially below the axis of rotation, and wherein the volume reduction arrangement is configured to reduce the clutch volume CV relative to the resting volume RV, wherein at least one volume reducing element is arranged on a component arranged in said housing and rotatable relative to said housing, wherein the volume reduction arrangement comprises at least one volume reducing element which projects into the clutch space thereby reducing the clutch volume, and wherein the component is in the torus space.

8. The hydrodynamic clutch device of claim 7, wherein the component comprises the turbine wheel, the at least one volume reducing element being arranged on a side of the turbine wheel which faces the clutch space.

9. The hydrodynamic clutch device of claim 7, wherein the component comprises a stator disposed between the turbine wheel and the pump wheel, the at least one volume reducing element being arranged on a side of the stator which faces the clutch space.

10. The hydrodynamic clutch device of claim 7, the hydrodynamic clutch device further comprising two seals surrounding the torsional vibration damper and forming an encapsulation which serves as the at least one volume reducing element.

11. A hydrodynamic clutch device for establishing and releasing a working connection between a drive and a takeoff, comprising:

a housing rotatable around an axis of rotation, the housing defining a clutch space having a clutch volume CV;

a pump wheel and a turbine wheel which are disposed in the housing and define a torus space having a torus volume TV;

a mechanical transmission circuit disposed in the clutch space and comprising a bridging clutch and a torsional vibration damper; and a volume reduction arrangement in the housing, wherein a fluid is distributed throughout the housing and has a total volume comprising at least the torus volume TV and the clutch volume CV during an operating phase of the hydrodynamic clutch device, wherein the fluid in the housing decreases from the total volume to a resting volume RV by the force of gravity after a predetermined minimum resting phase of the hydrodynamic clutch device, a top of the resting volume RV being at least essentially below the axis of rotation, wherein the volume reduction arrangement is configured to reduce the clutch volume CV relative to the resting volume RV, wherein the volume reduction arrangement comprises at least one volume reducing element which projects into the clutch space thereby reducing the clutch volume, wherein the at least one volume reducing element is arranged on a component arranged in said housing and rotatable relative to said housing, wherein the component is the torsional vibration damper, the hydrodynamic clutch device further comprising two seals surrounding the torsional vibration damper and forming an encapsulation which serves as the at least one volume reducing element, and wherein the encapsulation has a lubricating channel for allowing the fluid in the clutch space to leak therethrough.

12. A hydrodynamic clutch device for establishing and releasing a working connection between a drive and a takeoff, comprising:

a housing rotatable around an axis of rotation, the housing defining a clutch space having a clutch volume CV;

a pump wheel and a turbine wheel which are disposed in the housing and define a torus space having a torus volume TV;

a mechanical transmission circuit disposed in the clutch space and comprising a bridging clutch and a torsional vibration damper; and a volume reduction arrangement in the housing, wherein a fluid is distributed throughout the housing and has a total volume comprising at least the torus volume TV and the clutch volume CV during an operating phase of the hydrodynamic clutch device, wherein the fluid in the housing decreases from the total volume to a resting volume RV by the force of gravity after a predetermined minimum resting phase of the hydrodynamic clutch device, a top of the resting volume RV being at least essentially below the axis of rotation, wherein the volume reduction arrangement is configured to reduce the clutch volume CV relative to the resting volume RV, wherein the volume reduction arrangement comprises at least one volume reducing element which projects into the clutch space thereby reducing the clutch volume, wherein the at least one volume reducing element is arranged on a component arranged in said housing and rotatable relative to said housing, wherein the component is the torsional vibration damper, the hydrodynamic clutch device further comprising two seals surrounding the torsional vibration damper and forming an encapsulation which serves as the at least one volume reducing element, and wherein the encapsulation is configured so that the encapsulation has a capsule space which is larger than minimum to hold the torsional vibration damper.

* * * * *